United States Patent
Yao (10) Patent No.: US 10,769,964 B2
(45) Date of Patent: Sep. 8, 2020

(54) FLIGHT TRAINING SUPPORT SYSTEM, PORTABLE TERMINAL AND FLIGHT TRAINING SUPPORTING PROGRAM

(71) Applicant: E3 Co., Ltd., Tokyo (JP)

(72) Inventor: Bingwei Yao, Tokyo (JP)

(73) Assignee: E3 Co., Ltd., Tokyo (JP)

( * ) Notice: Subject to any disclaimer, the term of this patent is extended or adjusted under 35 U.S.C. 154(b) by 540 days.

(21) Appl. No.: 15/517,625

(22) PCT Filed: Jan. 19, 2016

(86) PCT No.: PCT/JP2016/051396
§ 371 (c)(1),
(2) Date: Apr. 7, 2017

(87) PCT Pub. No.: WO2017/126026
PCT Pub. Date: Jul. 27, 2017

(65) Prior Publication Data
US 2018/0268740 A1  Sep. 20, 2018

(51) Int. Cl.
G09B 19/16 (2006.01)
G08G 5/00 (2006.01)
G07C 5/08 (2006.01)

(52) U.S. Cl.
CPC ......... G09B 19/165 (2013.01); G08G 5/0008 (2013.01); G08G 5/0013 (2013.01); G08G 5/0078 (2013.01); G07C 5/0858 (2013.01)

(58) Field of Classification Search
CPC .................................................. G09B 19/165
USPC .......................................................... 434/35
See application file for complete search history.

(56) References Cited

FOREIGN PATENT DOCUMENTS

| JP | 2004-224183 A | 8/2004 |
|---|---|---|
| JP | 2007-127914 A | 5/2007 |
| JP | 2010-528925 A | 8/2010 |
| JP | 2013-502663 A | 1/2013 |

(Continued)

OTHER PUBLICATIONS

"Reception of ADS-B (display of virtual radar)" http://sky.geocities.jp/adab_jwa/rovadab.html, Dec. 6, 2014.

*Primary Examiner* — Kesha Frisby
(74) *Attorney, Agent, or Firm* — Polsinelli PC (57) ABSTRACT

There are provided a portable terminal 10 to be brought into an airplane for use, an ADS-B receiver 20 for receiving an ADS-B signal of the airplane, and a headset 30 to be used for a communication between an airplane and an air traffic control tower and a conversation in the airplane, and flight information of an own airplane which is detected by a sensor provided in the portable terminal 10, flight information of another airplane which is to be indicated by the ADS-B signal received by the ADS-B receiver 20 and a conversation voice to be input/output to/from the headset 30 are mutually synchronized and are recorded on the portable terminal 10. In addition to information to be collected in the airplane (the flight information of the own airplane and the conversation voice to be exchanged in the airplane), consequently, all of the flight information of another airplane flying around the own airplane and the conversation voice to be exchanged by a communication between the airplane and the air traffic control tower are recorded in a synchronization form. Thus, various situations in a training flight can be reproduced as accurately as possible after the flight.

5 Claims, 5 Drawing Sheets

(56) References Cited

FOREIGN PATENT DOCUMENTS

| WO | WO-2008/152310 A | 12/2008 |
| WO | WO-2011/025331 A2 | 3/2011 |

FLIGHT TRAINING SUPPORT SYSTEM, PORTABLE TERMINAL AND FLIGHT TRAINING SUPPORTING PROGRAM

CROSS REFERENCE TO RELATED APPLICATIONS

This application is a National Phase filing under 35 U.S.C. § 371 of PCT/JP2016/051396 filed on Jan. 19, 2016 under 35 U.S.C. § 119. The entire contents of this application are hereby incorporated by reference.

TECHNICAL FIELD

The present invention relates to a flight training support system, a portable terminal and a flight training supporting program and is suitably used for a system capable of reproducing a situation in a flight when performing review after a training flight.

BACKGROUND ART

In flight training of a pilot on an airplane, conventionally, an instructor rides on the airplane together to perform a training flight and executes evaluation on the ground after the training flight. In learning to be performed after the training flight, a trainee performs review while tracing a memory such as a flight situation, his action, a note given by the instructor or the like in a training flight. Referring to the learning method depending on the memory, however, it is hard to perform effective review because a human memory has a limit.

To solve the problem, there is proposed a training support system capable of performing effective post learning when carrying out flight training (for example, see Patent Document 1). Referring to the system described in the Patent Document 1, a portable flight information recording device including a GPS and an inclination sensor is brought into an airframe to record flight information such as a latitude, a longitude, an altitude, an azimuth, an inclination of an airframe or the like. After a training flight, a flight information reproducing device reproduces the flight information recorded in the training flight together with 3D map data and superimposes and displays a flight trajectory on a 3D map.

Moreover, there is also proposed flight test equipment capable of recording and visualizing every type of digital data such as a video, a voice and graphic data to be captured in an airplane (see Patent Document 2, for example). The Patent Document 2 discloses how to synchronize and record video data to be recorded on a video tape recorder, voice data to be recorded on a cassette, meta data on each stream (a voice, a video and a parameter), a time track and the like.

Furthermore, there is also proposed a system capable of converting flight data into analog data and recording the analog data on a CVR without changing hardware and software in an existing CVR (see Patent Document 3, for example). Referring to the system described in the Patent Document 3, a data converter for a CVR is added to an existing CVR for recording voice information in a cockpit in analog data. The data converter for a CVR converts altitude information of an airplane fetched from a pressure altimeter into a digital signal in a predetermined format and outputs the digital signal to a modulating unit, and furthermore, calculates position information and time information about the digital signal based on a GPS signal received from a GPS satellite and outputs them to the modulating unit. The modulating unit modulates the altitude information, the position information and time information into an analog signal in a voice band and transmits the analog signal to a microphone area input terminal of the CVR. Consequently, the CVR can record each analog data on a voice, an altitude, a position and a time in a lump.

Patent Document 1: Japanese Laid-Open Patent Publication No. 2007-127914
Patent Document 2: Japanese Unexamined Patent Application Publication (Translation of PCT Application) No. 2010-528925
Patent Document 3: Japanese Laid-Open Patent Publication No. 2004-224183

DISCLOSURE OF THE INVENTION

Referring to the technologies described in the Patent Documents 1 to 3, however, only information to be collected in an airplane is recorded. In other words, there are only recorded flight information (a latitude, a longitude, an altitude, an azimuth, an inclination of an airframe and the like) to be acquired through a sensor of a portable terminal brought into the airplane or an instrument in the airplane, a conversation voice exchanged in a cockpit, and a video in the cockpit which is to be photographed by a video camera or the like.

Although the record of information representing a part of a flight situation in a training flight can be confirmed after the flight, therefore, there is a problem in that the other situations cannot be reproduced accurately and effective review is hard to perform.

The present invention has been made to solve the problem and has an object to enable various situations in a training flight to be reproduced as accurately as possible after the flight, thereby causing a trainee to enable execution of more effective review.

In order to attain the object, a flight training support system according to the present invention includes a portable terminal to be brought into an airplane for use, an ADS-B receiver for receiving an automatic dependent surveillance-broadcast signal of the airplane, and a headset to be used for a communication between an airplane and an air traffic control tower and a conversation in the airplane, and flight information of an own airplane which is detected by a sensor provided in the portable terminal, flight information of another airplane which is to be indicated by the automatic dependent surveillance-broadcast signal received by the ADS-B receiver and a conversation voice to be input/output to/from the headset are mutually synchronized and are recorded on the portable terminal.

According to the present invention having the structure described above, in addition to information to be collected in the airplane (the flight information of the own airplane which is to be detected by the sensor of the portable terminal and the conversation voice to be exchanged in the airplane via the headset), all of the flight information of another airplane flying around the own airplane (which is indicated by the automatic dependent surveillance-broadcast signal) and the conversation voice to be exchanged by a communication between the airplane and the air traffic control tower via the headset are recorded in a synchronization form. Based on the recording information, therefore, various situations in a training flight can be reproduced as accurately as possible after the flight. Thus, a trainee can perform more effective review.

BEST MODE FOR CARRYING OUT THE INVENTION

Figure 1:
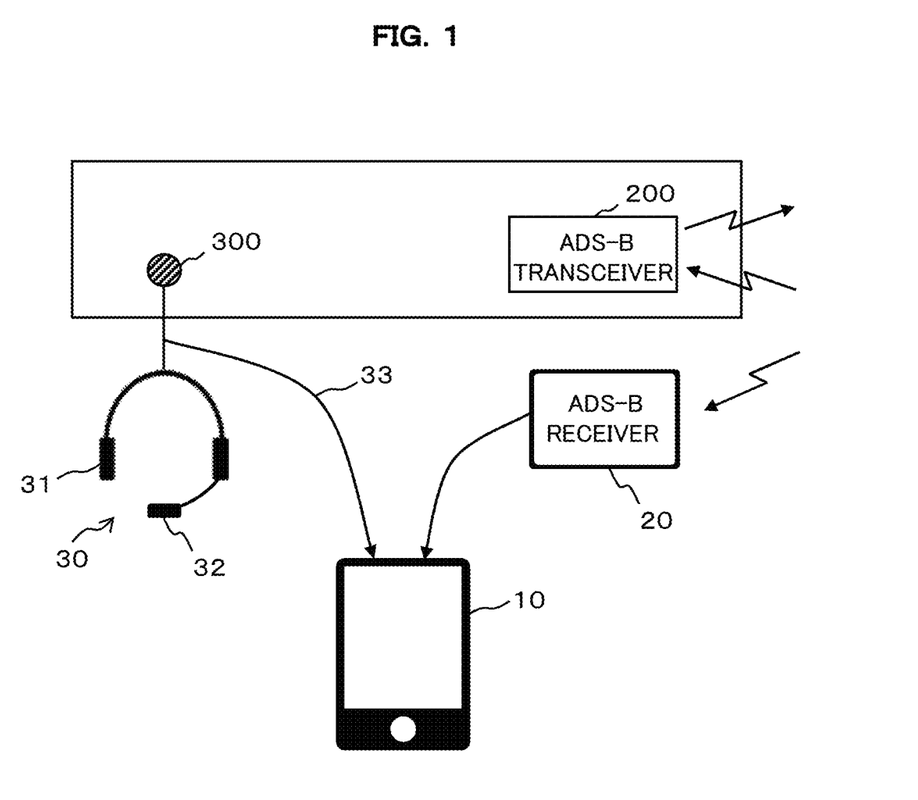
FIG. 1 is a diagram showing an example of a hardware structure of a flight training support system according to the present embodiment.

An embodiment according to the present invention will be described with reference to the drawings. FIG. 1 is a diagram showing an example of a hardware structure of a flight training support system according to the present embodiment. As shown in FIG. 1, the flight training support system according to the present embodiment includes a portable terminal 10 to be brought into an airplane for use, an ADS-B receiver 20 for receiving an ADS-B (Automatic Dependent Surveillance-Broadcast) signal of an airplane, and a headset 30 to be used for a communication between an airplane and an air traffic control tower and a conversation in the airplane.

The portable terminal 10 is a smartphone, for example, and has a flight training supporting program (an application) according to the present embodiment installed therein. A function to be offered by the flight training supporting program will be described below in detail.

The ADS-B receiver 20 is of such a portable type as to be brought into an airplane for use separately from an ADS-B transceiver 200 to be normally provided in the airplane. The ADS-B receiver 20 receives an ADS-B signal transmitted from the ADS-B transceiver 200 of another airplane. The ADS-B signal to be received includes flight information such as identifiers, current positions, altitudes and airspeeds of other airplanes. The ADS-B receiver 20 is not restricted to the portable type but may be brought and put fixedly in the airplane separately from the ADS-B transceiver 200.

The headset 30 is used in connection to a connection jack 300 in the airplane, and includes a headphone 31 for outputting a receiving voice on the other party side which is input through the connection jack 300, and a microphone 32 for inputting a personal transmitting voice to be given to the other party side. The headset 30 according to the present embodiment has a branch line 33 to be branched from a signal line connecting the connection jack 300 to the headphone 31 and the microphone 32 and both conversation voices (a transmitting voice and a receiving voice) to be obtained via the headphone 31 and the microphone 32 can be branched and output to the branch line 33.

Figure 2:
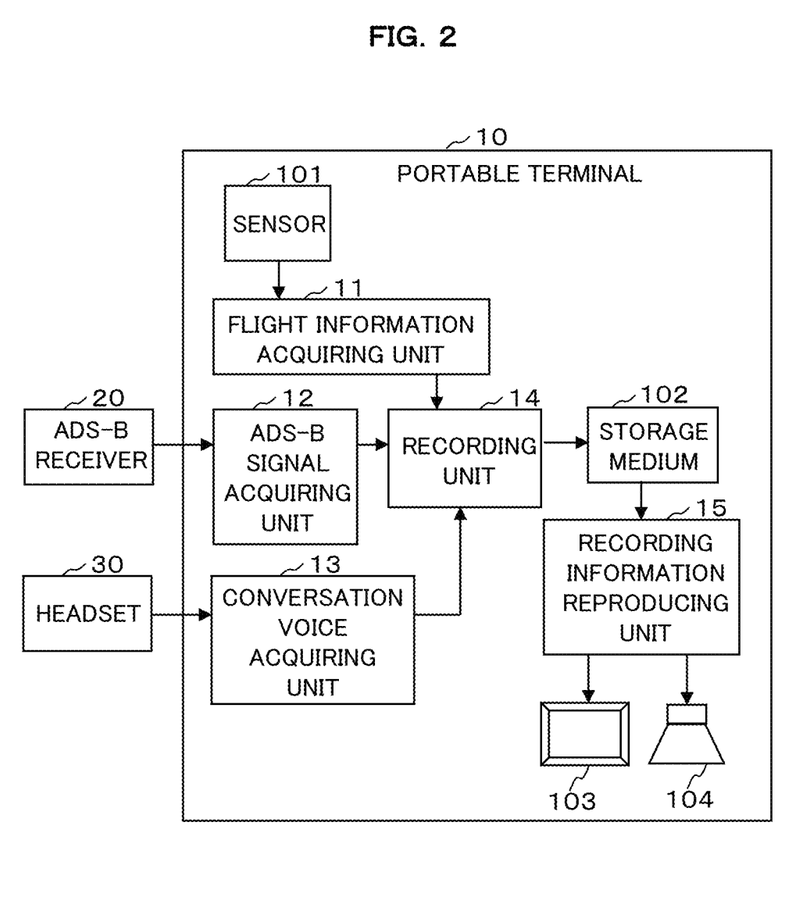
FIG. 2 is a block diagram showing an example of a structure of a portable terminal according to the present embodiment.

FIG. 2 is a block diagram showing an example of a structure of the portable terminal 10. As shown in FIG. 2, the portable terminal 10 according to the present embodiment includes, as a hardware structure, a sensor 101 for detecting flight information of an airplane, a storage medium 102 for storing various information, a display 103 for displaying the various information, and a speaker 104 for outputting a voice.

Moreover, the portable terminal 10 according to the present embodiment includes a flight information acquiring unit 11, an ADS-B signal acquiring unit 12, a conversation voice acquiring unit 13, a recording unit 14 and a recording information reproducing unit 15 as a functional structure to be offered by the flight training supporting program. These functional blocks 11 to 15 actually include a CPU, an RAM and an ROM in a computer and the like and are implemented by an operation of the flight training supporting program stored in a storage medium such as an RAM, an ROM, a hard disk or a semiconductor memory. The storage medium storing the flight training supporting program may be the same as or different from the storage medium 102.

The sensor 101 detects position information such as a latitude, a longitude, an altitude and the like which represent a position where an own airplane is flying and posture information such as an azimuth, an inclination of an aircraft and the like which represent a flight posture of the own airplane. For example, the sensor 101 includes a 9-axis sensor (a 3-axis acceleration sensor, a 3-axis angular velocity sensor, a 3-axis magnetic field sensor), a GPS sensor, and an altitude and barometric pressure sensor.

The flight information acquiring unit 11 acquires the flight information of the own airplane which is to be detected by the sensor 101. The flight information acquiring unit 11 repetitively acquires the flight information at a predetermined time interval, for example.

The ADS-B signal acquiring unit 12 acquires the ADS-B signal received by the ADS-B receiver 20. The ADS-B signal acquiring unit 12 repetitively acquires the ADS-B signal at a predetermined time interval, for example. It is preferable that the repetition cycle should be synchronized with a cycle in which the flight information acquiring unit 11 acquires the flight information.

A timing in which the ADS-B signal acquiring unit 12 acquires the ADS-B signal from the ADS-B receiver 20 may be coincident with a timing in which the ADS-B receiver 20 receives the ADS-B signal from another airplane. In this case, the ADS-B signal acquiring unit 12 acquires an ADS-B signal every time the ADS-B receiver 20 receives the ADS-B signal from another airplane.

The conversation voice acquiring unit 13 acquires a conversation voice (a transmitting voice and a receiving voice) to be input/output to/from the headset 30. The conversation voice to be input/output to/from the headset 30 includes both a conversation voice to be exchanged through a communication between an airplane and an air traffic control tower and a conversation voice to be exchanged between an instructor and a trainee in the airplane. In other words, according to the present embodiment, the headset 30 is provided with the branch line 33 to acquire a voice branched and output to the branch line 33 through the portable terminal 10. Therefore, it is possible to acquire both the conversation voice of the communication and the conversation voice in the airplane.

The recording unit 14 mutually synchronizes the flight information (a latitude, a longitude, an altitude, an azimuth, an inclination of an aircraft and the like) of an own airplane which is to be acquired by the flight information acquiring unit 11, flight information (a current position, an altitude, an airspeed and the like) of another airplane which is to be indicated by an ADS-B signal to be acquired by the ADS-B signal acquiring unit 12, and a conversation voice to be acquired by the conversation voice acquiring unit 13 and records them on the storage medium 102.

For example, the recording unit 14 continuously records, on the storage medium 102, the conversation voice (including a time zone in a silent state) to be acquired by the conversation voice acquiring unit 13 while a recording start button of an application is pressed down and a recording end button is then pressed down. Furthermore, the recording unit 14 records, on the storage medium 102, the flight information of the own airplane and another airplane which are to be repetitively acquired at predetermined time intervals by the flight information acquiring unit 11 and the ADS-B signal acquiring unit 12 together with a time stamp corresponding to a voice recording time.

The recording information reproducing unit 15 displays a flight trajectory of the own airplane on the display 103 based on the flight information of the own airplane which is recorded on the storage medium 102 through the recording unit 14, displays the flight trajectory of another airplane on the display 103 based on the flight information of another airplane which is recorded on the storage medium 102, and outputs the conversation voice recorded on the storage medium 102 from the speaker 104 when a reproducing button of the application is pressed down.

Figure 3:
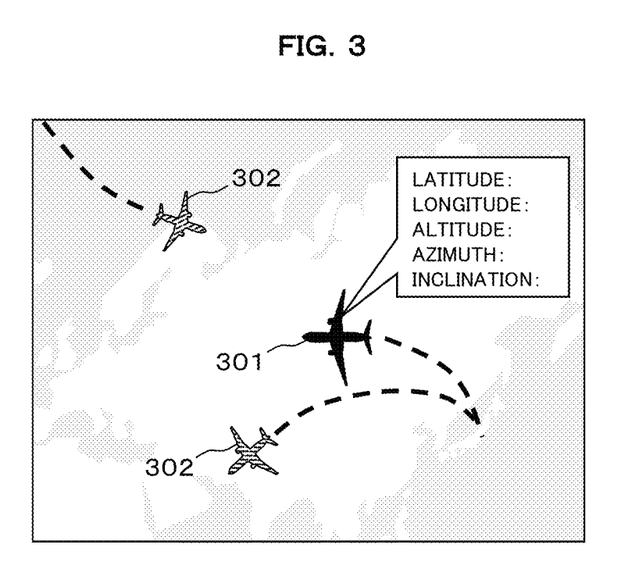
FIG. 3 is a view showing an example of screen display of recording information to be reproduced by a recording information reproducing unit according to the present embodiment.

FIG. 3 is a view showing an example of screen display of information to be reproduced by the recording information reproducing unit 15 according to the present embodiment. As shown in FIG. 3, the recording information reproducing unit 15 performs screen display, on a map, an own airplane and another airplane through predetermined marks 301 and 302 capable of mutually identifying them. The mark 301 represents the own airplane and the mark 302 represents another airplane. Herein, icons representing shapes of the airplanes are used as the marks 301 and 302. Moreover, the flight trajectories of the own airplane and another airplane are indicated in dotted lines. It is not necessary to always display the flight trajectories in the dotted lines.

The mark 301 representing the own airplane is a user interface which can be designated by a touch operation. When an operation for designating the mark 301 of the own airplane is performed during the display of the flight trajectory of the own airplane, the recording information reproducing unit 15 pop-up displays the flight information of the own airplane in the designated position (a latitude, a longitude, an altitude, an azimuth, an inclination of an airframe and the like).

The pop-up display of the flight information is performed for a predetermined time period, and is then cancelled automatically, for example. Alternatively, the pop-up display may be continuously performed until the operation for designating the mark 301 of the own airplane is performed again. In the case in which the pop-up display is continuously performed, the recording information reproducing unit 15 sequentially reproduces the flight information for the respective time stamps and updates the contents to be displayed.

Moreover, the recording information reproducing unit 15 controls to start the output of a conversation voice from a portion where the flight information of the own airplane is synchronously recorded simultaneously with the pop-up display of the flight information. The output of the conversation voice is performed for a predetermined time period and so be then stopped automatically. Alternatively, the conversation voice may be output continuously until the operation for designating the mark 301 of the own airplane is performed again.

The mark 302 representing another airplane may also be set to be a user interface which can be designated by a touch operation. When the operation for designating the mark 302 is performed, the flight information of another airplane in the designated position (a current position, an altitude, an airspeed and the like of another airplane which are to be obtained through an ADS-B signal) may be pop-up displayed.

Although the description has been given to the example in which the conversation voice is output only when the operation for designating the mark 301 of the own airplane is performed, moreover, the conversation voice may be always output during the reproduction. In this case, when the operation for designating the mark 301 of the own airplane is performed, it is sufficient to add the pop-up display of the flight information to the output of the conversation voice.

As described above, the flight information of the own airplane, the flight information of another airplane and the conversation voice are recorded on the storage medium 102 in a synchronization state. Therefore, the reproduction through the recording information reproducing unit 15 is also performed in a state in which these information are synchronized. Consequently, it is possible to accurately reproduce a position where the own airplane is present, which airplane flies around the own airplane and what conversation is made at that time.

English skills are absolutely indispensable to a trainee who aims to be a pilot. In particular, it is very hard to make a communication through an English conversation with an air traffic control tower. The causes of the difficulty of a communication includes a noise. This is influenced by an altitude of an airplane, a distance from a communication party, a weather or the like. In some cases, the noise is larger than a conversation voice in a bad condition.

Moreover, the causes of the difficulty for the trainee to make a communication include a large amount of information to be exchanged in a one-time communication. For example, when a communication is made with a ground control before take-off, information such as an own identification, a color code, a destination and an arrival time are informed to an air-traffic controller and information such as altimeter regulation, a wind direction, a wind velocity, an active runway, a Squawk code and a taxing instruction are received from the air-traffic controller. It is necessary to perform these information exchanges in only several seconds. For this reason, they are very hard to perform. If a communication during a flight is performed, it gives unexpected (irregular) contents in steering. Consequently, the difficulty is further increased.

According to the flight training support system in accordance with the present embodiment, the conversation voice of the communication can also be recorded on the storage medium 102 and then reproduced by the recording information reproducing unit 15. In addition, the conversation voice can be reproduced in a synchronization state with the flight information of the own airplane and the flight information of another airplane flying around the own airplane. Therefore, it is possible to effectively confirm what flight situation, what communication is made together with an air-traffic controller and how to make a communication. Moreover, it is possible to subsequently confirm the contents of the communication which could not be heard well due to a noise.

In the case in which the content of the communication is corrected by an instructor in the communication or the case in which the instructor gives some warning during a training flight, furthermore, a conversation voice made between the instructor and a trainee at that time is also recorded in a synchronization state with the conversation voice of the communication, the flight information of the own airplane and the flight information of another airplane. For this reason, it is possible to accurately reproduce what situation is brought and what is corrected or given as a warning by the instructor. Consequently, the trainee can perform more effective review.

Figure 4:
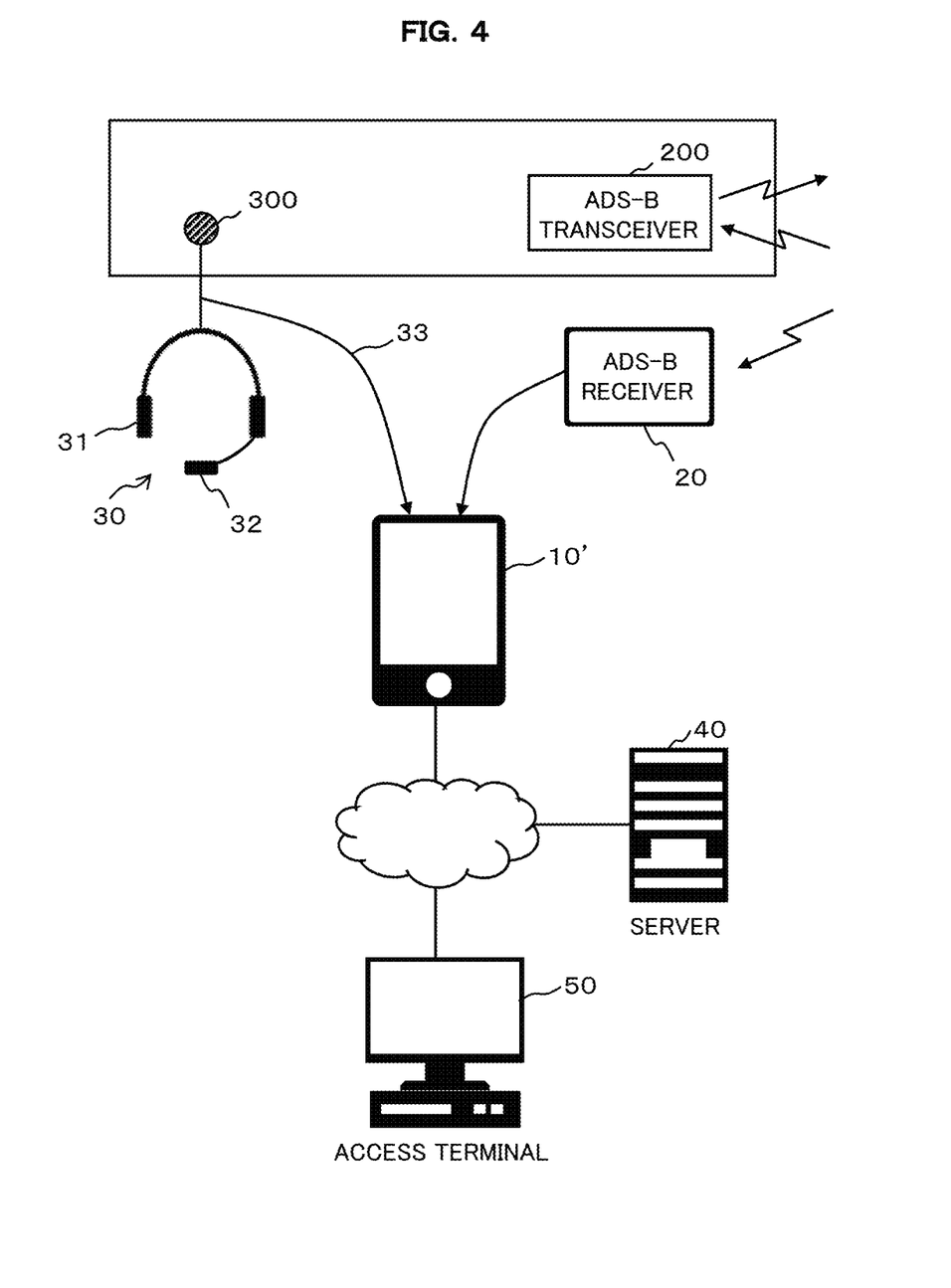
FIG. 4 is a diagram showing an example of a hardware structure of a flight training support system according to a variant of the present embodiment.

FIG. 4 is a diagram showing an example of a hardware structure of a flight training support system according to a variant of the present embodiment. In the example shown in FIG. 4, the flight training support system includes a portable terminal 10' in place of the portable terminal 10. Moreover, the flight training support system shown in FIG. 4 further includes a server 40 and an access terminal 50.

Figure 5:
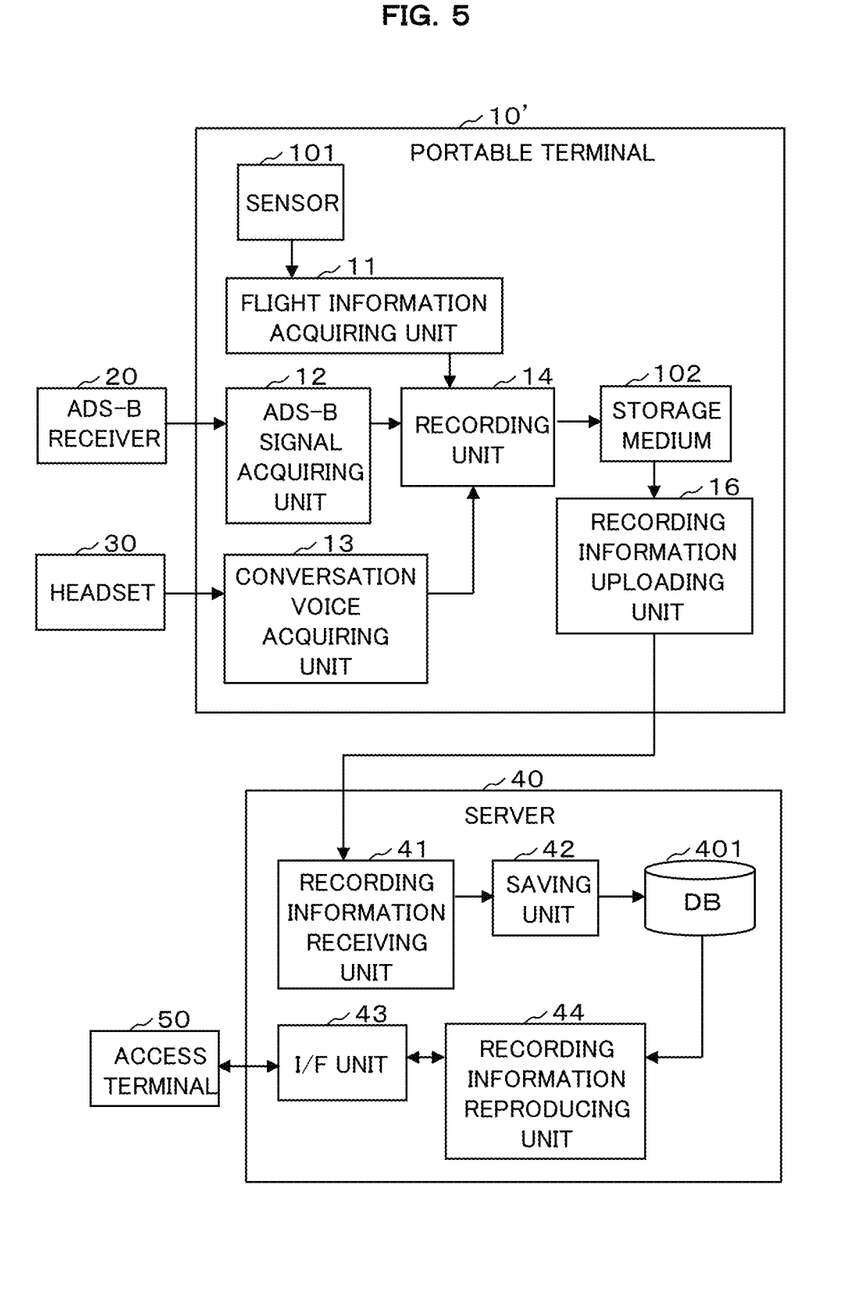
FIG. 5 is a block diagram showing an example of structures of a portable terminal and a server according to the variant of the present embodiment.

FIG. 5 is a block diagram showing an example of structures of the portable terminal 10' and the server 40. In the example shown in FIG. 5, the portable terminal 10' includes a recording information uploading unit 16 in place of the recording information reproducing unit 15. Moreover, the server 40 includes, as a functional structure thereof, a recording information receiving unit 41, a saving unit 42, an interface unit 43 and a recording information reproducing unit 44. Furthermore, the server 40 includes a database 401 as a storage medium.

The recording information uploading unit 16 of the portable terminal 10' uploads, onto the server 40, the flight information of the own airplane, the flight information of another airplane and the conversation voice which are recorded on the storage medium 102 (these will be hereinafter referred to as recording information collectively). The uploading is performed when the uploading button is pressed down after the recording end button of the application is pressed down, for example. At the same time that the recording unit 14 performs a recording operation over the storage medium 102, the recording information of the storage medium 102 may be uploaded onto the server 40 automatically at all time.

when the recording information is to be uploaded, the server 40 is also notified of predetermined identification information. This identification information can utilize a user ID to be input in use of an application (a flight training supporting program) installed in the portable terminal 10', for example.

The recording information receiving unit 41 of the server 40 receives, together with the user ID, the recording information uploaded by the recording information uploading unit 16. The saving unit 42 saves, in the database 401, the recording information received by the recording information receiving unit 41 in relation to the user ID.

The interface unit 43 controls the exchange of information between the access terminal 50 and the server 40. For example, the interface unit 43 accepts a request for reproducing the recording information from the access terminal 50 and offers, to the access terminal 50, the recording information reproduced from the database 401 by the recording information reproducing unit 15 as a response thereof. The access terminal 50 is an optional terminal provided on the ground and can be configured from a personal computer, for example.

When the interface unit 43 receives the request for reproducing the recording information from the access terminal 50, the recording information reproducing unit 44 reads the recording information saved in the database 401 in relation to the user ID included in the reproducing request and performs rendering of the display screen shown in FIG. 3 to offer the display screen to the access terminal 50 through the interface unit 43.

In other words, the recording information reproducing unit 44 controls the access terminal 50 to display the flight trajectory of the own airplane on a screen based on flight information of the own airplane which is uploaded from the portable terminal 10' and to display the flight trajectory of another airplane on the screen based on the flight information of another airplane which is uploaded from the portable terminal 10', and to output a conversation voice uploaded from the portable terminal 10'.

According to the flight training support system shown in FIGS. 4 and 5, it is possible to display and confirm the flight information of the own airplane and another airplane in the training flight by using the large display screen of the access terminal 50 configured from a personal computer or the like. In the case in which the flight training is performed plural times, moreover, recording information in each flight training can be uploaded and saved in the server 40 and a desired one of the recording information can be reproduced at any time.

Although the description has been given to the example in which the position information such as the latitude, the longitude and the altitude representing the position where the own airplane is flying is detected by the sensor 101 and the flight information acquiring unit 11 acquires the position information in the embodiment, the present invention is not restricted thereto. For example, the ADS-B signal to be transmitted from the ADS-B transceiver 200 may be received by the ADS-B receiver 20 and the flight information acquiring unit 11 may acquire information such as a current position and an altitude indicated by an identifier of the own airplane through the ADS-B signal. In this case, the portable terminal 10 does not need to include a GPS sensor or an altitude and barometric pressure sensor as the sensor 101. Depending on an identifier of an airplane included in the ADS-B signal, it is possible to determine whether the ADS-B signal is transmitted from the ADS-B transceiver 200 of the own airplane or the ADS-B transceiver 200 of another airplane.

Although the description has been given to the example in which the conversation voice is continuously recorded on the storage medium 102 while the recording start button is pressed down and the recording end button is then pressed down in the embodiment, moreover, the present invention is not restricted thereto. For example, the recording unit 14 may decide whether a conversation voice to be acquired by the conversation voice acquiring unit 13 is in a silent state or a sound state, and may fragmentally record, on the storage medium 102, only a conversation voice in the sound state. In this case, the recording unit 14 associates the flight information to be acquired by the flight information acquiring unit 11 and the ADS-B signal acquiring unit 12 in the sound state with each voice information recorded fragmentally and records them on the storage medium 102.

In the case in which the conversation voice (including a time zone in the silent state) is recorded continuously as in the embodiment, moreover, the display manner of the mark 301 of the own airplane may be changed when the mark 301 of the own airplane is to be displayed based on the flight information of the own airplane which is recorded synchronously with a time zone in which the conversation voice is in the sound state in the display of the marks 301 and 302 of the own airplane and another airplane as in FIG. 3. Consequently, a trainee can visually and easily confirm a scene in which the conversation voice is recorded in the sound state, thereby reproducing and confirming the conversation voice through an operation for designating the mark 301 of the own airplane readily.

In the case in which a conversation voice (including a time zone in the silent state) is continuously recorded as in the embodiment, moreover, bookmark information may be associated and recorded when the conversation voice is changed from the silent state to the sound state and skip reproduction may be enabled based on the bookmark information in the reproduction of the recording information through the recording information reproducing units 15 and 44. Consequently, the trainee can easily select only the scene in which the conversation voice is recorded in the sound state, thereby reproducing the recording information easily.

Furthermore, it is also possible to add weather information about a departure place and an arrival place, weather information during a flight and the like as information to be recorded on the storage medium 102.

In addition, the embodiments are only illustrative for concreteness to carry out the present invention and the technical scope of the present invention should not be thereby construed to be restrictive. In other words, the present invention can be carried out in various configurations without departing from the gist or main features thereof.

EXPLANATION OF DESIGNATION

10, 10' portable terminal
11 flight information acquiring unit
12 ADS-B signal acquiring unit
13 conversation voice acquiring unit
14 recording unit
15 recording information reproducing unit
16 recording information uploading unit
20 ADS-B receiver
30 headset
31 headphone
32 microphone
33 branch line
40 server
44 recording information reproducing unit
50 access terminal
101 sensor
102 storage medium

The invention claimed is:

1. A flight training support system comprising:
a portable terminal to be brought into an airplane for use;
an ADS-B receiver for receiving an automatic dependent surveillance-broadcast signal of the airplane; and
a headset to be used for a communication between the airplane and an air traffic control tower and a conversation in the airplane,
the portable terminal including:
   a sensor for detecting flight information of the airplane;
   a flight information acquiring unit for acquiring flight information of an own airplane which is to be detected by the sensor;
   an ADS-B signal acquiring unit for acquiring the automatic dependent surveillance-broadcast signal received by the ADS-B receiver;
   a conversation voice acquiring unit for acquiring a conversation voice to be input/output to/from the headset; and
   a recording unit for mutually synchronizing the flight information of the own airplane which is to be acquired by the flight information acquiring unit, flight information of another airplane which is to be indicated by the automatic dependent surveillance-broadcast signal to be acquired by the ADS-B signal acquiring unit, and the conversation voice to be acquired by the conversation voice acquiring unit and recording them;
wherein the portable terminal further includes a recording information reproducing unit for displaying the own airplane on a screen based on the flight information of the own airplane which is recorded by the recording unit and displaying another airplane on the screen based on the flight information of the another airplane which is recorded by the recording unit, and outputting the conversation voice which is recorded by the recording unit;
wherein the recording information reproducing unit displays the own airplane and the another airplane on a screen through a predetermined mark and controls to start output of the conversation voice from a portion where the flight information in the designated position is recorded synchronously when an operation for designating the mark of the own airplane is performed;
wherein the recording unit continuously records the conversation voice including a time zone in a silent state, and
the recording information reproducing unit changes a display manner of a mark of the own airplane when displaying the mark of the own airplane based on the flight information of the own airplane which is recorded synchronously with a time zone in which the conversation voice is in a sound state.

2. A flight training support system comprising:
a portable terminal to be brought into an airplane for use;
an ADS-B receiver for receiving an automatic dependent surveillance-broadcast signal of the airplane; and
a headset to be used for a communication between the airplane and an air traffic control tower and a conversation in the airplane,
the portable terminal including:
   a sensor for detecting flight information of the airplane;
   a flight information acquiring unit for acquiring flight information of an own airplane which is to be detected by the sensor;
   an ADS-B signal acquiring unit for acquiring the automatic dependent surveillance-broadcast signal received by the ADS-B receiver;
   a conversation voice acquiring unit for acquiring a conversation voice to be input/output to/from the headset; and
   a recording unit for mutually synchronizing the flight information of the own airplane which is to be acquired by the flight information acquiring unit, flight information of another airplane which is to be indicated by the automatic dependent surveillance-broadcast signal to be acquired by the ADS-B signal acquiring unit, and the conversation voice to be acquired by the conversation voice acquiring unit and recording them;
wherein the portable terminal further includes a recording information uploading unit for uploading, onto a server, the flight information of the air plane, the flight information of the another airplane and the conversation voice which are recorded by the recording unit, and
the server includes a recording information reproducing unit for controlling to cause an accessed terminal to display the own airplane on a screen based on the flight information of the own airplane which is uploaded by the recording information uploading unit and to display the another airplane on the screen based on the flight information of the another airplane which is uploaded by the recording information uploading unit, and to output the conversation voice which is uploaded by the recording information uploading unit;
wherein the recording information reproducing unit displays the own airplane and the another airplane on a screen through a predetermined mark and controls to start output of the conversation voice from a portion where the flight information in the designated position is recorded synchronously when an operation for designating the mark of the own airplane is performed;

wherein the recording unit continuously records the conversation voice including a time zone in a silent state, and the recording information reproducing unit changes a display manner of a mark of the own airplane when displaying the mark of the own airplane based on the flight information of the own airplane which is recorded synchronously with a time zone in which the conversation voice is in a sound state.

3. A flight training support system comprising:
a portable terminal to be brought into an airplane for use;
an ADS-B receiver for receiving an automatic dependent surveillance-broadcast signal of the airplane; and
a headset to be used for a communication between the airplane and an air traffic control tower and a conversation in the airplane,
the portable terminal including:
  a sensor for detecting flight information of the airplane;
  a flight information acquiring unit for acquiring flight information of an own airplane which is to be detected by the sensor;
  an ADS-B signal acquiring unit for acquiring the automatic dependent surveillance-broadcast signal received by the ADS-B receiver;
  a conversation voice acquiring unit for acquiring a conversation voice to be input/output to/from the headset; and
  a recording unit for mutually synchronizing the flight information of the own airplane which is to be acquired by the flight information acquiring unit, flight information of another airplane which is to be indicated by the automatic dependent surveillance-broadcast signal to be acquired by the ADS-B signal acquiring unit, and the conversation voice to be acquired by the conversation voice acquiring unit and recording them;
wherein the portable terminal further includes a recording information reproducing unit for displaying the own airplane on a screen based on the flight information of the own airplane which is recorded by the recording unit and displaying another airplane on the screen based on the flight information of the another airplane which is recorded by the recording unit, and outputting the conversation voice which is recorded by the recording unit;
wherein the recording unit continuously records the conversation voice including a time zone in a silent state and associates and records bookmark information when the conversation voice is changed from the silent state to the sound state, and
the recording information reproducing unit has a function for skip reproducing the flight information of the own airplane, the flight information of the another airplane and the conversation voice based on the bookmark information.

4. A flight training support system comprising:
a portable terminal to be brought into an airplane for use;
an ADS-B receiver for receiving an automatic dependent surveillance-broadcast signal of the airplane; and
a headset to be used for a communication between the airplane and an air traffic control tower and a conversation in the airplane,
the portable terminal including:
  a sensor for detecting flight information of the airplane;
  a flight information acquiring unit for acquiring flight information of an own airplane which is to be detected by the sensor;
  an ADS-B signal acquiring unit for acquiring the automatic dependent surveillance-broadcast signal received by the ADS-B receiver;
  a conversation voice acquiring unit for acquiring a conversation voice to be input/output to/from the headset; and
  a recording unit for mutually synchronizing the flight information of the own airplane which is to be acquired by the flight information acquiring unit, flight information of another airplane which is to be indicated by the automatic dependent surveillance-broadcast signal to be acquired by the ADS-B signal acquiring unit, and the conversation voice to be acquired by the conversation voice acquiring unit and recording them;
wherein the recording unit decides whether a conversation voice to be acquired by the conversation voice acquiring unit is in a silent state or a sound state and fragmentally records only the conversation voice in the sound state, and records the flight information of the own airplane to be acquired by the flight information acquiring unit and the flight information of the another airplane which is to be indicated by the automatic dependent surveillance-broadcast signal to be acquired by the ADS-B signal acquiring unit in the sound state synchronously with the conversation voice recorded fragmentally.

5. A flight training support system comprising:
a portable terminal to be brought into an airplane for use;
an ADS-B receiver for receiving an automatic dependent surveillance-broadcast signal of the airplane; and
a headset to be used for a communication between the airplane and an air traffic control tower and a conversation in the airplane,
the portable terminal including:
  a sensor for detecting flight information of the airplane;
  a flight information acquiring unit for acquiring flight information of an own airplane which is to be detected by the sensor;
  an ADS-B signal acquiring unit for acquiring the automatic dependent surveillance-broadcast signal received by the ADS-B receiver;
  a conversation voice acquiring unit for acquiring a conversation voice to be input/output to/from the headset; and
  a recording unit for mutually synchronizing the flight information of the own airplane which is to be acquired by the flight information acquiring unit, flight information of another airplane which is to be indicated by the automatic dependent surveillance-broadcast signal to be acquired by the ADS-B signal acquiring unit, and the conversation voice to be acquired by the conversation voice acquiring unit and recording them;
wherein the portable terminal further includes a recording information uploading unit for uploading, onto a server, the flight information of the air plane, the flight information of the another airplane and the conversation voice which are recorded by the recording unit, and
the server includes a recording information reproducing unit for controlling to cause an accessed terminal to display the own airplane on a screen based on the flight information of the own airplane which is uploaded by the recording information uploading unit and to display the another airplane on the screen based on the flight information of the another airplane which is uploaded by the recording information uploading unit, and to output the conversation voice which is uploaded by the recording information uploading unit;

wherein the recording unit continuously records the conversation voice including a time zone in a silent state and associates and records bookmark information when the conversation voice is changed from the silent state to the sound state, and the recording information reproducing unit has a function for skip reproducing the flight information of the own airplane, the flight information of the another airplane and the conversation voice based on the bookmark information.

* * * * *